United States Patent
Funge et al.

(10) Patent No.: US 7,263,462 B2
(45) Date of Patent: Aug. 28, 2007

(54) NON-DISRUPTIVE EMBEDDING OF SPECIALIZED ELEMENTS

(75) Inventors: John Funge, Sunnyvale, CA (US); Ron Musick, Belmont, CA (US); Daniel Dobson, Atherton, CA (US); Nigel Duffy, San Francisco, CA (US); Michael McNally, Cupertino, CA (US); Xiaoyuan Tu, Sunnyvale, CA (US); Ian Wright, Mountain View, CA (US); Wei Yen, Los Altos Hills, CA (US); Brian Cabral, San Jose, CA (US)

(73) Assignee: AiLive, Inc., Palo Alto, CA (US)

( * ) Notice: Subject to any disclaimer, the term of this patent is extended or adjusted under 35 U.S.C. 154(b) by 0 days.

(21) Appl. No.: 11/036,975

(22) Filed: Jan. 14, 2005

(65) Prior Publication Data

US 2006/0036398 A1 Feb. 16, 2006

Related U.S. Application Data (60) Provisional application No. 60/592,980, filed on Jul. 30, 2004.

(51) Int. Cl.
*G06G 7/00* (2006.01)

(52) U.S. Cl. .......................... 702/179; 706/20; 706/46; 706/47; 706/50; 707/100; 707/102

(58) Field of Classification Search ................ 702/179; 707/100, 102; 706/12, 25, 28, 20, 47, 46, 706/50
See application file for complete search history.

(56) References Cited

U.S. PATENT DOCUMENTS

| | | | | |
|---|---|---|---|---|
| 5,778,157 A | * | 7/1998 | Oatman et al. | 706/46 |
| 5,995,955 A | * | 11/1999 | Oatman et al. | 706/50 |
| 6,192,338 B1 | * | 2/2001 | Haszto et al. | 704/257 |
| 6,216,014 B1 | * | 4/2001 | Proust et al. | 455/558 |
| 6,363,384 B1 | * | 3/2002 | Cookmeyer et al. | 707/10 |
| 6,389,405 B1 | * | 5/2002 | Oatman et al. | 706/46 |
| 6,467,085 B2 | * | 10/2002 | Larsson | 717/165 |
| 6,477,553 B1 | * | 11/2002 | Druck | 708/313 |
| 6,636,860 B2 | * | 10/2003 | Vishnubhotla | 707/100 |
| 6,640,231 B1 | * | 10/2003 | Andersen et al. | 707/102 |
| 2002/0165839 A1 | * | 11/2002 | Taylor et al. | 706/20 |
| 2003/0041040 A1 | * | 2/2003 | Bertrand et al. | 706/12 |
| 2003/0084015 A1 | * | 5/2003 | Beams et al. | 706/47 |
| 2004/0010505 A1 | * | 1/2004 | Vishnubhotla | 707/100 |
| 2006/0036398 A1 | | 2/2006 | Funge et al. | |

FOREIGN PATENT DOCUMENTS

WO    WO 2006/015234 A2    2/2006

* cited by examiner

*Primary Examiner*—Carol S. W. Tsai
(74) *Attorney, Agent, or Firm*—Swernofsky Law Group PC (57) ABSTRACT

A system including at least (1) specialized elements that are restricted to a particular domain of data analysis or processing and (2) configurable data that permits the specialized elements to be tailored to a particular application. The configurable data expands applicability of the specialized elements to plural applications within the particular domain. The specialized elements can be provided by a supplier to a developer without the supplier having detailed knowledge of structures and internal operations used by the particular application. The particular application can be generated by the developer without the developer having detailed knowledge of internal operations used by the specialized elements.

14 Claims, 7 Drawing Sheets

NON-DISRUPTIVE EMBEDDING OF SPECIALIZED ELEMENTS

CROSS REFERENCE TO RELATED APPLICATION

This application claims priority from U.S. Provisional Patent Application No. 60/592,980, titled "Battlefield Learning", filed Jul. 30, 2004, in the name of the same invention, Express Mail Mailing No. ED 061 458 126 US.

BACKGROUND OF THE INVENTION

1. Field of the Invention

The invention relates to embedding specialized elements, for example statistical analysis or machine learning techniques, into application programs in a relatively non-disruptive and efficient manner.

2. Related Art

It is often problematic to attempt to embed expert knowledge about a specialized domain into an application program. In the known art, either

- The expert knowledge is supplied in a very general form, such as for example a library of callable functions. While this allows developers of many different application programs to use a generic library, this technique involves a substantial amount of information by developers about the expert knowledge and how to apply it.
- The expert knowledge is supplied in a very specific form, such as for example custom program or system written for use by the application program. While this allows the developer of the application program to use that expert knowledge, this technique involves a substantial amount of information by the creator of the custom program or system about how the expert knowledge will be applied to the application program.

Neither of these techniques is fully satisfactory, as either they involve having the developer of the application program learn a substantial amount of information they might not have time to fully learn and understand, or they involve having the developer of the custom program or system learn a substantial amount of information about the application program. Both of these problems have the drawback that they increase the expense, in terms of effort, money, time, and trust between developers.

Accordingly, it would be desirable to provide techniques by which application developers can make easy use of specialized elements provided by expert knowledge providers, with a minimum of cross-domain knowledge required, while still maintaining broad applicability of the specialized elements, thus avoiding drawbacks of the known art.

Many different computer program applications could benefit from embedding specialized program elements that enable use of specialized knowledge, including statistical analysis, data mining, machine learning, OLAP (online analytical processing), and the like. Conventional integration of such specialized elements into application programs generally takes one of two forms.

First, the specialized elements could be applied at development time or "offline." This approach is limited in that the specialized elements cannot learn from or otherwise adapt at runtime.

Second, the specialized elements could be applied at runtime or "online." One major benefit of this approach is that the elements can adapt and personalize to an individual user.

Current approaches to providing specialized elements (for example, embedded packages such as those for statistical analysis) at runtime generally fall into two categories. (a) Supply very widely applicable specialized elements, but require the client (that is, a developer writing the code for use by an end user) to identify all relevant features and cast them into a pre-defined format at runtime. (b) Supply very narrowly applicable specialized elements that have all features pre-defined, but that are only applicable to a specific application. Each of these approaches has various drawbacks.

If the specialized elements are widely applicable, the client generally must learn and utilize extensive expertise in order to tie the elements into the application. This process can be problematic, especially if the client does not understand which features are important for proper function of the specialized elements. Furthermore, even if the client does understand which features need to be provided, the client might not know or understand details of exactly how those features should be provided, or how those features should be provided for optimum effect.

The supplier of the specialized elements can assist the client with these matters. However, the supplier might need access to the client's application source code in order to provide useful assistance. This can be unacceptable if the client wants or needs to keep its application source code secret, such as for example to protect trade secrets and other intellectual property embodied in the source code.

Finally, any changes to application program code can necessitate changes to how the specialized elements are tied into the application. As a result, the client might need assistance from the supplier throughout the entire coding process. Such assistance can be very time consuming, and therefore expensive, especially if it must be provided to the very end (sometimes called the "last mile") of the coding process.

For at least these reasons, conventional widely applicably specialized elements can be overly expensive for the developer, especially in domains requiring specialized statistical analysis.

With very narrowly applicable specialized elements, the process of tying the elements to a particular application can be simpler. However, such specialized elements will only be useful with the particular application for which they are specifically designed. Every time similar elements are needed for another application, they will have to be re-written or the old elements will have to be extensively modified, even if their general operation and use is the same as previous implementations. This is not an efficient development process.

The foregoing issues particularly arise in, but are not limited to, the contexts of machine learning, statistical analysis, and OLAP (online analytical processing).

For example, game and simulation developers are often experts at creating graphics, environments, player and non-player characters, simple artificial intelligences, and the like. However, they often have only limited experience in the application of more complex machine learning to software agents that control the game's or simulation's characters.

Likewise, developers of financial application software are often experts at calculations involving financial transactions, graphics and conventions for depicting those transactions, and the like. However, they often have only limited experience in the application of machine learning to analysis of financial trends and likely actions of actors in a market place.

In both of these examples, the developers might turn to outside suppliers for specialized elements than enable such machine learning. When the developers attempt to incorporate those elements into their applications, they will encounter the issues discussed above.

SUMMARY OF THE INVENTION

The invention provides techniques, including methods and systems, that provide for integration of specialized elements (such as for example, machine learning and statistical methods) into application programs, without having either the developers of the application programs or the specialized elements have to know much about the system they are being fitted into.

In one embodiment, both the application programs and the specialized elements conform to a known ontology (i.e., a model of a set of data, a model of techniques for operating on that data, and a model of a set of semantic meanings for those techniques. For example, in one embodiment, the known ontology might include a computer game including melee combat, where the melee combat might include either player characters or non-player characters.

At a development time, the application program and the specialized elements (such as for example, machine learning or statistical methods) are bound together using an application program/specialized element interface, which more specifically defines the possible ways in which the application program might interact with the specialized elements. This has the effect that the application program need not have substantial knowledge of the specialized elements, nor that the specialized elements have substantial knowledge of the application program, so long as both substantially conform to the agreed ontology.

In one embodiment, the developer of the application program provides a set of program header files, from which an embodiment of the invention can create the application program/specialized element interface. In such embodiments, the specialized elements might apply substantial internal knowledge about the agreed ontology to provide a rich set of statistical techniques and machine learning techniques, with very little information necessarily exchanged between the two.

The success of applying specialized elements (such as for example, statistical methods and machine learning techniques) to an application program depends critically on the amount, quality, content and nature of the input data the statistical methods and machine learning techniques obtain from the application program. For example, in the science of meteorology the task of predicting future weather patterns usually requires access to a large amount of accurate data that records past weather patterns. The content of the data is important in that it must include as much information as possible that is relevant to making accurate predictions. It should also exclude as much extraneous and irrelevant information as possible since this information might otherwise overwhelm or confuse the statistical methods used. The nature of the past data is important in the sense that predictions may be facilitated by transforming the data in some way before applying the statistical method. For example, instead of providing raw temperature values as input some statistical methods work better if the data is first transformed into more discrete values such as "hot", "warm" or "cold". Other specialized elements may prefer yet different types of data, such as data that has been processed to extract its principal components (sometimes referred to herein as "PCA").

Those skilled in the art of applying specialized elements (such as for example, statistical methods and machine learning techniques) to data have crucial experience, techniques and methods for selecting relevant data and excluding irrelevant data. The also use, are aware of, and have experience in a great many techniques and methods for massaging and processing data so they can maximize the effectiveness of different statistical techniques. Effective use of this knowledge can make the difference between success and failure of those specialized elements. Those not skilled in the art of applying those specialized elements often lack experience and an in-depth knowledge of how the underlying algorithms work. They are often unaware of what input data is even relevant when trying to apply particular specialized elements (such as for example, particular statistical methods or machine learning techniques). Their lack of in-depth knowledge and experience means that they are also often unaware of the necessary transformations of their data that they need to perform, and are thus unable to make effective use of specialized elements that would otherwise be powerful and useful for their business.

The invention addresses these issues through a system and methodology, which (1) restricts specialized elements, such as for example statistical methods and machine learning techniques, to a particular problem within a particular domain of data analysis or processing; and (2) provides configurable data that permits the specialized elements to be tailored to a particular application program. One advantage of item 1 is that those not skilled in the art of applying those specialized elements can still effectively apply those specialized elements to their business. This is possible because those skilled in the art of applying statistical methods can incorporate, in advance, knowledge about those specialized elements, and can incorporate, in advance, transformations and representations of the data as deemed necessary to make those can incorporate, in advance, effective tools for solving their specific problem. One advantage of item 2 is that those skilled in the art of applying those specialized elements can provide prepackaged solutions that work for a wide variety of applications within the relevant domain. Without item 2 it would only be possible for those skilled in the art of applying those specialized elements to supply prepackaged solutions for one specific application, or at most a small class of applications that were nearly identical. Taken together, these two aspects of the invention enable an entirely new business model for the supplier of those specialized elements.

In the preferred embodiment of the invention, the inventors have discovered a set of transformations of basic information about a game world in a video game that is effective in games that involve melee combat. In particular, the transformations have proved effective in applying a set of specialized elements (such as for example, statistical techniques involved in statistical machine learning) to the problem of a non-player character (NPC) learning, in real-time, to play by observing a character controlled by a human.

This application refers to basic information about the game world as the game's "raw features" and to information that is the result of the inventive transformations of those raw features as the "derived features". The inventors have discovered that the derived features comprise 90-99% of the information that is required to learn effectively. By packaging up the derived features and the specialized elements, the inventors have created a module that they refer to as the "battlefield learning module."

Furthermore, the inventors have discovered that by adding a system or methodology for configurable data, (as described with respect to item 2 above) the invention allows game developers to specify their own set of raw features. The module can therefore apply to many different games that fall within the melee combat genre. One advantage thereof is that game developers, who are not typically skilled in the art of applying the provided specialized elements, can more effectively use those specialized elements within their game products. Note that, this level of configurability is completely different and far beyond the usual trivial amount of configurability that most software provides during the installation process (e.g. when software is installed the user is often allowed to pick the install directory, choose some file locations, etc.). Moreover, the inventors have discovered that the data configuration process can be made simple enough that the supplier of the specialized elements does not need to be involved in the process of fitting it to the client's game. This is because all the required configuration is within the context of the application domain of the module and thus uses concepts that are familiar to the client. That is, the client only needs to be an expert in the application domain and the client's own application; the client does not need to be an expert in the use of the provided specialized elements.

In addition to video games, the invention also applies to many other applications that involve components that would benefit from the provided specialized elements. For example, the invention could be used to create modules for various real-time applications such as:

- A module that could be configured by the air force to create software for the operation of unmanned drones that learn in real-time from a human pilot in a real battlefield situation.
- A module could be created that could be configured by stock brokers to be used in financial applications that adapt in real-time to changing market conditions.
- A module could be created that is designed to be configured by medical practitioners for various medical applications in which some apparatus or equipment must adapt to changing conditions in real-time.

The invention also applies to non real-time statistical data processing applications such as OLAP (online analytical processing). In traditional OLAP style applications of statistical methods for data processing, the supplier of the specialized elements (i.e., those including the statistical methods) does not write any of the features. Instead all the features are written by the client. This is in marked contrast to the case that occurs when using the invention. That is, when using the invention the bulk of the features are written by the supplier. This difference in "ownership" of the features is a major difference between the invention and any known art.

Of course, in traditional applications the supplier and the client can be, and often are, one in the same. In such cases, an opportunity to sell the specialized elements and the features together as a package to a third party only exists if the third party's application is ostensibly identical.

The invention also applies when the specialized elements are
(1) embodied in a software package that can be configured,
(2) embodied in a hardware device that can be configured,
(3) embodied in a device that is a combination or hybrid of software and hardware, or
(4) embodied in a plurality of devices operating in conjunction or cooperation, such as for example a cluster processor.

Process Overview

In the preferred embodiment, the invention is used by a supplier to encapsulate the supplier's specialized elements (such as for example, statistical processing algorithms and knowledge of a domain) in what the inventors refer to as a "module". A module is designed to be used by a developer to incorporate those specialized elements into their application. A module may consist of various distinct components including, but not limited to, a runtime library for statistical processing of data, configurable data, applications for configuring the configurable data, example configurations, example applications, and documentation. Different components are designed to be used in various operations that occur at two different times: development time ("devtime") and runtime. In particular, the configurable data and the applications for configuring the configurable data are designed to be used at devtime. For one example, the runtime library for statistical processing of data is designed to be used at runtime.

In a preferred embodiment, at devtime the developer must provide a set of raw feature definition (RFD) files, effect files and parameter files, as described below. The files are read by a devtime application, called the "featurizer," which compiles them into a set of derived features that the inventors refer to as the "cooked features". At runtime the cooked features are read in by the runtime library in order to customize the runtime library to the particular application to which it is linked. More specifically, the derived features that comprise the cooked features are instantiated in memory and hooked up to the raw features that are computed by the application.

Those skilled in the art would have little difficulty in seeing how the cooked features could be represented differently. For example, a relational database could be used. With some minor modifications it is also possible to represent the cooked features as code that is generated by the featurizer application. In which case the generated code may have to be compiled at devtime so that it could be linked in with application and runtime library. This may lead to some speed advantages in evaluating the derived features at runtime. Note that, if the code was in an interpreted language (e.g. Python), or if there was a compiler embedded within the application, then there would be no need to compile the generated code in advance at devtime.

Note that during the developer's overall development process devtime and runtime are interleaved. That is, the developer will run their application to test the behavior of their application with the supplier's runtime library and the initial cooked features. In early attempts, the behavior is unlikely to be correct. The errors could be caused by, among other possibilities, bugs in the application, errors in computing the raw features, or errors or oversights in the configuration process. The developer will therefore engage in an iterative process of reconfiguring the configurable data, generating a new cooked features and re-testing their application.

Once the developer is happy with the behavior of their application and the interaction with the runtime library, the developer will ship their application to their users. For example, the developer might be the developer of a computer game that uses the battlefield learning module to create characters that can learn by example. The ultimate users of the application are people in their homes playing the game that, for example, they bought in a shop (or alternatively, people playing the game at an arcade). The users at home are using the battlefield learning module in runtime mode only and so the only components of the module that need ship with the game are the runtime library and the final cooked features.

Later, if the developer wishes to fix bugs that were not fixed earlier, or to add new functionality to the game, a new cooked features and (if necessary) a new runtime library, could be made available for the user to download or purchase as an upgrade or patch.

Extra Details on the Preferred Embodiment: Devtime

In a preferred embodiment, configuring the configurable data consists of two parts. The first part is concerned with making sure the required raw features are correctly and efficiently linked in to the application. The second part is concerned with allowing the developer to extend the raw features, and what and how effects should be instantiated in their application.

RFD files

In a preferred embodiment, hooking up the raw features is largely achieved using what the inventors refer to as raw feature definition (RFD) files. In particular, an RFD file is a regular C header file that is used to specify the raw features.

An initial RFD file is supplied to the developer as part of the module. The RFD file can also include other RFD files and other C header files initially supplied as part of the module. The other C header files and portions of the RFD files must remain fixed. They represent data structures that the supplier requires to be present for the subsequent correct functioning of the runtime library. The developer can however extend RFD files with their own data-structures. These additional data-structures will be correctly handled by the featurizer application, and corresponding raw features created. More specifically, the featurizer records inside the cooked feature object the offsets in bytes needed to access the different fields inside the RFD files.

The ability for the developer to add its own data-structures to the RFD file is part of what allows the module to be able to be used in more than one specific predetermined application. Rather, it can be used in any application in the correct domain ontology.

The idea behind RFD files is that when the application is compiled it is compiled with the RFD files. At runtime the values in the data-structures are filled in with important information about the application. For example, in a game the information will contain basic information about character's positions and orientations, etc. The big advantage of using RFD files is that the data-structures in the RFD file can be one and the same as the applications internal data-structures. For example, in a game a character's position data-structure can be used both by the statistical processing algorithms inside the runtime library and independently in the rest of the program, for instance, for rendering a depiction of the game world. This means that there does not have to be an additional potentially time-consuming step in which data is copied or marshaled from the applications own internal data-structures into those used by the runtime library. The RFD files therefore represent a method to gain added efficiency. If this added efficiency is not important a more traditional API that relies on copying data can be used instead. Those skilled in the art would recognize that the use of the RFD files is an optional extra device to increase efficiency and that alternatives exist that do not alter the fundamental nature of the invention.

Effect Files

In the preferred embodiment, deciding what and how effects should be instantiated in an application is primarily done with effect files. Each effect file instantiates a related collection of behaviors. For example, an effect file could contain behaviors related to movement. An individual behavior is usually parameterized and represents the potential to learn a specific behavior with respect to the supplied parameters. For example, a behavior could be defined to potentially learn to run away from a particular target when a certain condition is true.

Creating a new behavior that an NPC could potentially learn consists of supplying values for the behavior's parameters. The inventors call it instantiating a behavior. The exact set of parameters can vary depending on the effect. The inventors have discovered that a common set of parameters is a target and a condition. When the developer instantiates a behavior they provide actual values for the the condition and target. In this way a developer can create an effect to, for example, to potentially learn to run away from green orcs when the character is frightened. Or another effect, say, to learn to run toward blue flowers when there are a large number of dragons circling overhead. The options are limitless and again show how flexible the invention is in allowing a single module to apply to a huge number of possible applications.

Technically, the parameter values supplied by the developer have to be features. For example, they can be raw features created from the RFD files. But to allow greater flexibility, convenience and customizability there is also a special parameter file that provides a place where the developer can define their own derived features that represent important concepts in their application. Important concepts for each application will be different but they typically include predicates, targets, iterators, etc. that are relevant to the application. For example, in a certain game green orcs with yellow noses maybe an important aspect of the game. In another the list of all game green spaceships with large missiles may be important.

Behaviors are represented as template files. A template file defines a set of derived features in terms of some parameters (e.g. an unspecified condition and target). The derived features in a template can compute various functions of raw features, parameters and other derived features. The derived features can be simple transformations of raw features, such as computing relative coordinates from global ones. Or they can be defined recursively to perform sophisticated statistical functions of other derived features such as machine learning. The derived features can reference other derived features defined elsewhere in the file, defined in other template files, defined inside the runtime library, or defined in the parameter file.

The details of how a template or parameter file is represented is not particularly important. The inventors happen to used text files, but relational databases or code could equally well be used. It would also be obvious to anyone skilled in the art of writing software that a GUI, or configuration "wizard" could be trivially wrapped around the whole process.

The invention addresses drawbacks of the known art with a system that includes at least (1) specialized elements that are restricted to a particular domain of data analysis or processing and (2) configurable data that permits the specialized elements to be tailored to a particular application. The configurable data expands applicability of the specialized elements to plural applications within the particular domain.

The specialized elements can be provided by a supplier to a developer without the supplier having detailed knowledge of structures and internal operations used by the particular application. The particular application can be generated by the developer without the developer having detailed knowledge of internal operations used by the specialized elements.

By virtue of constriction to a particular domain and expansion within that domain, this runtime approach provides a middle ground between overly-broad and overly-narrow specialized elements.

The particular domain can be a particular form of game, simulation, or analysis program. Examples include, but are not limited to battlefield games, simulations, and analysis programs, and financial games, simulations, and analysis programs. The specialized elements can enable statistical analysis, data mining, machine learning, online learning, or online analytical processing in the particular domain. Other domains and types of specialized elements can also benefit from the approach of the invention.

The configurable data, once configured, provides a link between the particular application and the specialized elements within the domain. In a preferred embodiment, the configurable data includes templates provided by the supplier. These templates can be for one or more header files and/or parameters for the specialized elements.

The header files can define structures for features used by the application whereby the specialized elements can access those features. The parameters can specify predicates and targets for the specialized elements whereby the specialized elements can respond to queries from the particular application. Other types of header files, parameters, and templates can be used without departing from the invention.

In terms of "offline" versus "online" or "runtime," the invention is a modified runtime approach. The invention's approach actually involves operations that occur at two different times: development time ("devtime") and runtime.

The configurable data is configured by the developer at devtime to provide the link between the particular application and the specialized elements. These devtime operations involve identifying, constructing, and inserting all features (i.e., value, groups of values, data constructs, and the like) needed by the specialized elements into a pre-defined format. The resulting information about the features can be stored in various ways, for example as a flat file, computational graph, or relational database.

At runtime, the link provided by the configurable data is used to enable the specialized elements to respond to queries from the particular application. In particular, the specialized elements preferably use the stored configurable data to access features in the developer's code in order to perform some form of statistical analysis, data mining, machine learning, or the like.

Different techniques can be used to configure the data for the link between the specialized elements and the application. For example, the data can be configured through manual editing or through an input interface provided by the supplier along with the specialized elements. This interface can include a graphical user interface. Other techniques to configure the data can be used.

Once the data is configured, a featurizer provided by the supplier is run at devtime to create a linkable library that implements the specialized elements. The resulting linkable library is accessible by the particular application in accordance with the configurable data. In a preferred embodiment, the featurizer analyzes the configurable data to ensure proper dependencies between identified features and parameters.

After the library has been generated, the particular application can link to and use the library to marshal data from the particular application, to modify models used by the specialized elements based on the data, and to use the models to respond to the queries from the particular application.

The invention also encompasses methods performed in accordance with the foregoing description, computer programs and code that implement those methods, data structures used by those programs and code, and media that stores such programs, code and data structures. Other embodiments are possible.

After reading this application, those skilled in the art would recognize that the systems described herein provide an enabling technology, with the effect that heretofore advantageous features can be provided that heretofore were substantially infeasible.

DETAILED DESCRIPTION OF A PREFERRED EMBODIMENT

Preferred embodiments of the invention are described herein, including preferred device coupling, device functionality, and process steps. After reading this application, those skilled in the art would realize that embodiments of the invention might be implemented using a variety of other techniques not specifically described herein, without undue experimentation or further invention, and that such other techniques would be within the scope and spirit of the invention.

Incorporated Disclosures

The embodiments described herein can be used in conjunction with embodiments described in the following documents:

U.S. Provisional Patent Application No. 60/592,980, titled "Battlefield Learning", filed Jul. 30, 2004, in the name of the same inventors, Express Mail Mailing No. ED 061 458 126 US.

U.S. patent application Ser. No. 10/885,495, titled "Real Time Context Learning by Software Agents", filed Jul. 6, 2004, in the name of inventors John Funge, Ron Musick, Daniel Dobson, Nigel Duffy, Michael McNally, Xiaoyuan Tu, Ian Wright, Wei Yen, and Brian Cabral, Express Mail Mailing No. EL 768 963 050 US.

"IKUNI BATTLEFIELD LEARNING USER MANUAL" (unpublished), iKuni Corporation (Jul. 1, 2004).

These documents are sometimes referred to herein as the Incorporated Disclosure, hereby incorporated by reference as if fully set forth herein.

Definitions

The general meaning of each of these terms is intended to be illustrative and in no way limiting.

The phrase "specialized elements" refers to data driven analytic tools, techniques, methods and code, for example but not limited to statistical analysis, data mining, machine learning, online learning, and online analytical processing (OLAP).

The phrases "machine learning," "artificial intelligence," and the like interchangeably refer to processes and techniques by which computers or other devices emulate learning and learned behavior, for example to emulate or to predict actions of humans or other actors. (Technically, machine learning is a subset of artificial intelligence; however, the terms are generally used in a broader and more interchangeable sense in this application.)

The phrases "online learning" and "online machine learning" refer to real-time machine learning in which models are built and modified "on the fly" in real-time in immediate or near-immediate response to training signals and other inputs. The models are then used to respond to real-time queries. Online learning is particularly useful in the contexts of games and simulations where immediate or near-immediate responses are particularly important.

The phrases "development time" and "devtime" refer to a time period during which a developer develops application code, including configuration of that code for inclusion of specialized elements.

The phrase "runtime" refers to a time period during which application code that has embedded specialized elements executes.

The phrase "module" refers to specialized elements that are utilized at runtime and the associated configuration information defined at devtime.

The phrase "supplier" refers to any people, businesses, or other entities, singularly or collectively, who provide modules to others for incorporation into application or other code.

The phrases "developer" refers to any people, businesses, or other entities, singularly or collectively, who are involved in designing, producing, developing, coding, and otherwise making application or other code.

The phrase "client" refers to a developer who receives modules from a supplier and incorporates those specialized elements into application or other code.

The phrase "developer supplied code" refers to code provided by one or more developers to enable some application, function, action, or use.

The phrase "user" or "end user" refers to any people, businesses, or other entities, singularly or collectively, who use an application or other code designed, developed, coded, or otherwise made by a developer.

The phrase "raw features" refers to a subset of values and structures used or generated by an application (i.e., "developer supplied code") that the specialized elements need to access, either directly or indirectly, in order to interact with that application.

The phrase "derived features" refers to values, structures, and functions used by specialized elements. Derived features can be derived based on one or more raw features and/or other derived features.

The scope and spirit of the invention is not limited to any of these definitions, or to specific examples mentioned therein, but is intended to include the most general concepts embodied by these and other terms.

Parties Involved in Use of Specialized Elements

Figure 1:
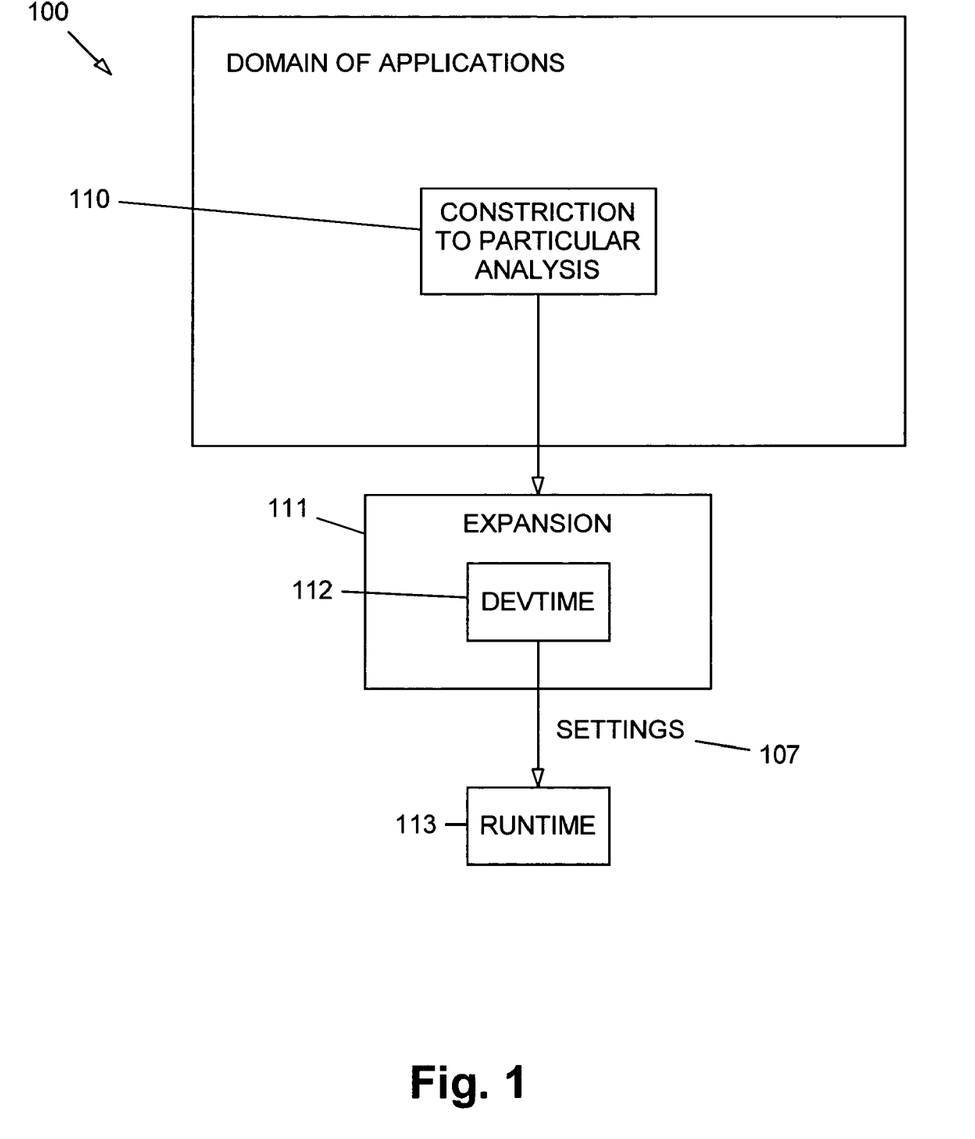
FIG. 1 shows a conceptual overview of several principals underlying the invention.

The system of the invention generally involves three distinct groups of people: supplier(s) 100, client(s) 101, and end user(s) 102. (Throughout this document, the singular of a noun is meant to encompass the plural and vice versa. For example, "supplier" encompasses both a single supplier and a group of suppliers. The singular will generally be used hereinafter for the sake of convenience.)

The supplier provides specialized elements to the client. The specialized elements enable some form of statistical analysis, data mining, machine learning, online learning, or online analytical processing for an application created by the client. The specialized elements can be embodied as modules and templates, shown in FIG. 1 as modules and templates 105, or in some other form.

The client configures the specialized elements and develops some type of application that can benefit from the specialized elements.

The end user uses the application delivered by the client. From the end user's perspective, the client is the developer of the application. (The client in the supplier/client relationship is the same as the developer in the developer/end user relationship.)

Figure 7:
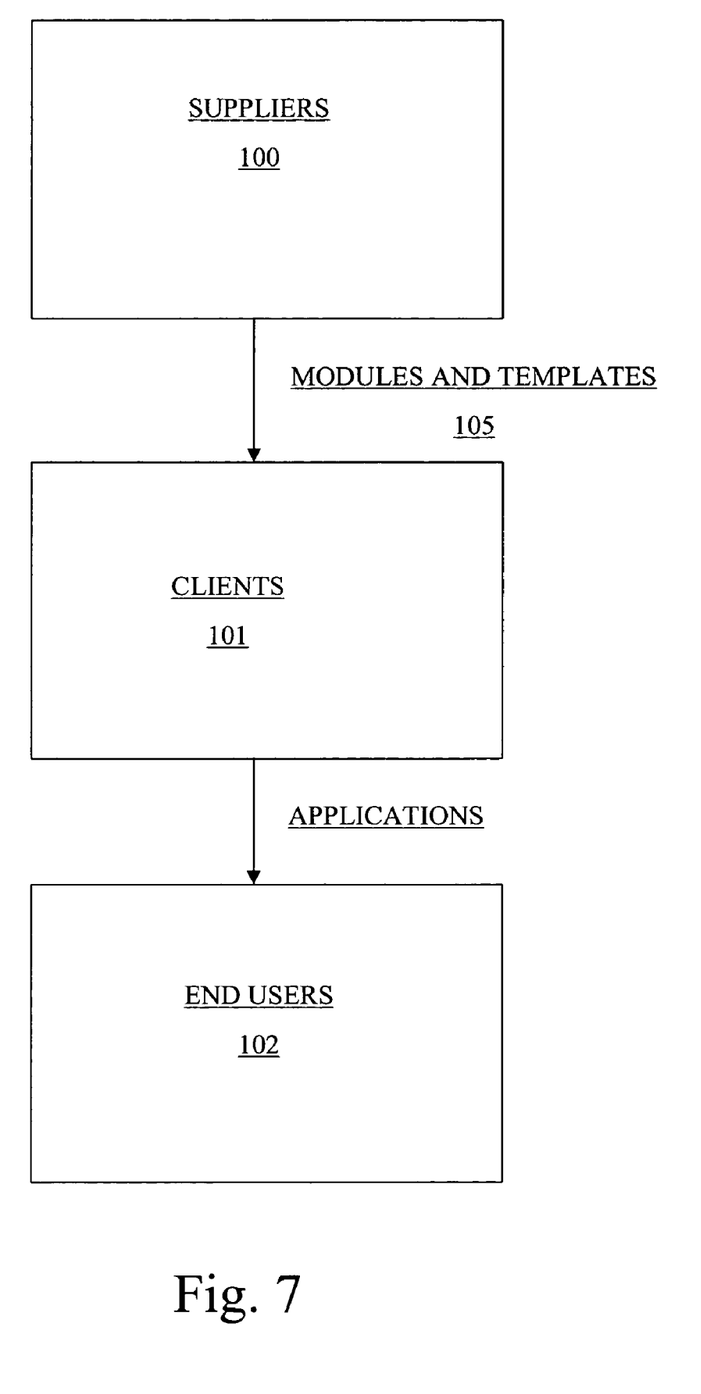
FIG. 7 shows a conceptual relationship between suppliers, clients and end-users according to the invention.

These relationships are illustrated in FIG. 7.

Knowledge of Parties

The specialized elements according to the invention are not provided by the supplier for use with a particular application. Rather, the specialized elements are provided for use with a domain of applications. Therefore, the supplier is unlikely to have detailed knowledge of structures and internal operations used by a particular application.

Likewise, the client is likely to have only limited knowledge of how the specialized elements perform their data analysis. The client might wish to have their application benefit from analysis techniques that they understand in a general sense but are not expert at developing. Thus, the client relies on the expertise of the supplier, as embedded in the specialized elements, to improve their application.

For example, game and simulation developers are often experts at creating graphics, environments, player and non-player characters, simple artificial intelligence, and the like. However, they often have only limited experience in the application of more complex machine learning to software agents that control the game's or simulation's characters. Games and simulations can be greatly enhanced by such machine learning, especially online machine learning that responds in realtime.

Likewise, developers of financial application software are often experts at calculations involving financial transactions, graphics and conventions for depicting those transactions, and the like. However, they often have only limited experience in the application of machine learning to analysis of financial trends and likely actions of actors in a market place. Financial software can be greatly enhanced by such machine learning.

In these and other contexts, the client relies on the supplier to deliver the specialized elements and to make the specialized elements relatively easy to embed in their application.

For at least these reasons, neither the supplier nor the client can be expected to have detailed knowledge of how the other party's contribution to the application operates. Neither the supplier nor the client is usually interested in expending resources to gain such knowledge. Furthermore, both parties might have a vested interest in keeping the details of the operation of their own contributions confidential, for example if trade secret information is embedded therein. Thus, the variable names, operation names, and other structures used by the specialized elements are almost certainly going to differ from those used by the application.

Constriction and Expansion

FIG. 1 illustrates the principals of constriction and expansion utilized by the invention.

Briefly, the invention utilizes a system that includes at least (1) specialized elements that are restricted to a particular domain of data analysis or processing and (2) configurable data that permits the specialized elements to be tailored to a particular application. The configurable data expands applicability of the specialized elements to plural applications within the particular domain.

As noted above, the specialized elements are provided for use with a domain of applications rather than with a single application. According to the invention, this domain is constricted to a particular type of analysis for a particular type of application. This constriction is represented by region 110 in FIG. 1.

Examples of particular types of analysis include, but are not limited to, statistical analysis, data mining, machine learning, online learning, and online analytical processing. Example of particular types of applications include, but are not limited to, battlefield games and simulations, flight games and simulations, fighting games and simulations, virtual reality games and simulations, financial games and simulations, and political games and simulations.

Constriction must be performed because the specialized elements and the application program should share a common ontology (i.e., way of looking at the world).

For example, any battlefield game or simulation is likely to share a common ontology with specialized elements designed to analyze actions on a battlefield. While specific details of structures and operations may differ, it will be possible to construct a correspondence between structures and operations used by each.

In contrast, the ontology for a financial simulation is entirely different from the ontology for a battlefield game. Specialized elements for analyzing a financial situation are almost certainly inapplicable to providing effective analysis in a battlefield setting. In almost every case, it would be difficult if not impossible to draw useful correspondences between the two world views.

Applicants note that exceptions can exist. For example, a stock market could be analogized to a battlefield, and correspondences could be generated based on that analogy. While the invention is applicable to such cases, the more common case will involve specialized elements and applications that share a common ontology.

As long as the specialized elements and application share a common ontology, the general types of data and operations used by each will have at least some degree of correlation. Some structures and operation will have one-to-one correspondences between the elements and the application. More complex correspondences might be needed for other structures and operations.

By drawing the proper correspondences within the ontology, the specialized elements will be able to be tailored to a particular application. This ability to tailor the specialized elements means that they can be used with a range of applications within their given domain. The applicability of the specialized elements to plural applications is referred to as "expansion." Such expansion is illustrated as region 111 in FIG. 1.

Correspondences between structures and operations used by the specialized elements and the application preferably are defined through configurable data supplied with the modules. This configurable data (after configuration) is shown in FIG. 1 as settings 107 and provides a link between the specialized elements and the application within the given domain.

In a preferred embodiment, the configurable data includes templates for one or more header files and/or parameters for the specialized elements. The header files can define data structures for features used by the application whereby the specialized elements can access those features. The parameters can specify predicates and targets for the specialized elements whereby the specialized elements can respond to queries from the particular application. Other types of header files, parameters, templates, and configurable data can be used without departing from the invention.

By virtue of constriction to a particular domain and expansion within that domain, the invention provides a middle ground between overly-broad and overly-narrow specialized elements.

As shown in the FIG. 1, constriction occurs as the specialized elements are generated by a supplier. Tailoring of the specialized elements (i.e., expansion) through the configurable data is performed by the client during "devtime."

Devtime and Runtime

FIG. 1 also illustrates principals of devtime and runtime according to the invention.

The configurable data is configured by the developer at devtime 112 (which corresponds to expansion 111). These devtime operations involve identifying, constructing, and inserting all features (i.e., value, groups of values, data constructs, and the like) needed by the specialized elements into a pre-defined format. The resulting information about the features can be stored in various ways, for example as a flat file, computational graph, relational database, or some other form.

The configured data, which is shown in FIG. 1 as settings 107, serves as a link between devtime 112 and runtime 113.

At runtime 113, the link provided by the configured data is used to enable the specialized elements to respond to queries from the particular application. In particular, the specialized elements preferably use the stored configured data to access features in the developer's code in order to perform some form of statistical analysis, data mining, machine learning, or the like. This process involves linking modules for the specialized elements to the application, marshalling data from the application, and using that data to perform analysis and modeling.

Runtime 113 operations can be performed by both the client (developer) and the end user. The client can perform runtime operations in order to train the application, to debug the application and the application's link to the specialized elements, and the like. The user performs runtime operation in normal use of the application.

Workflow

Figure 2:
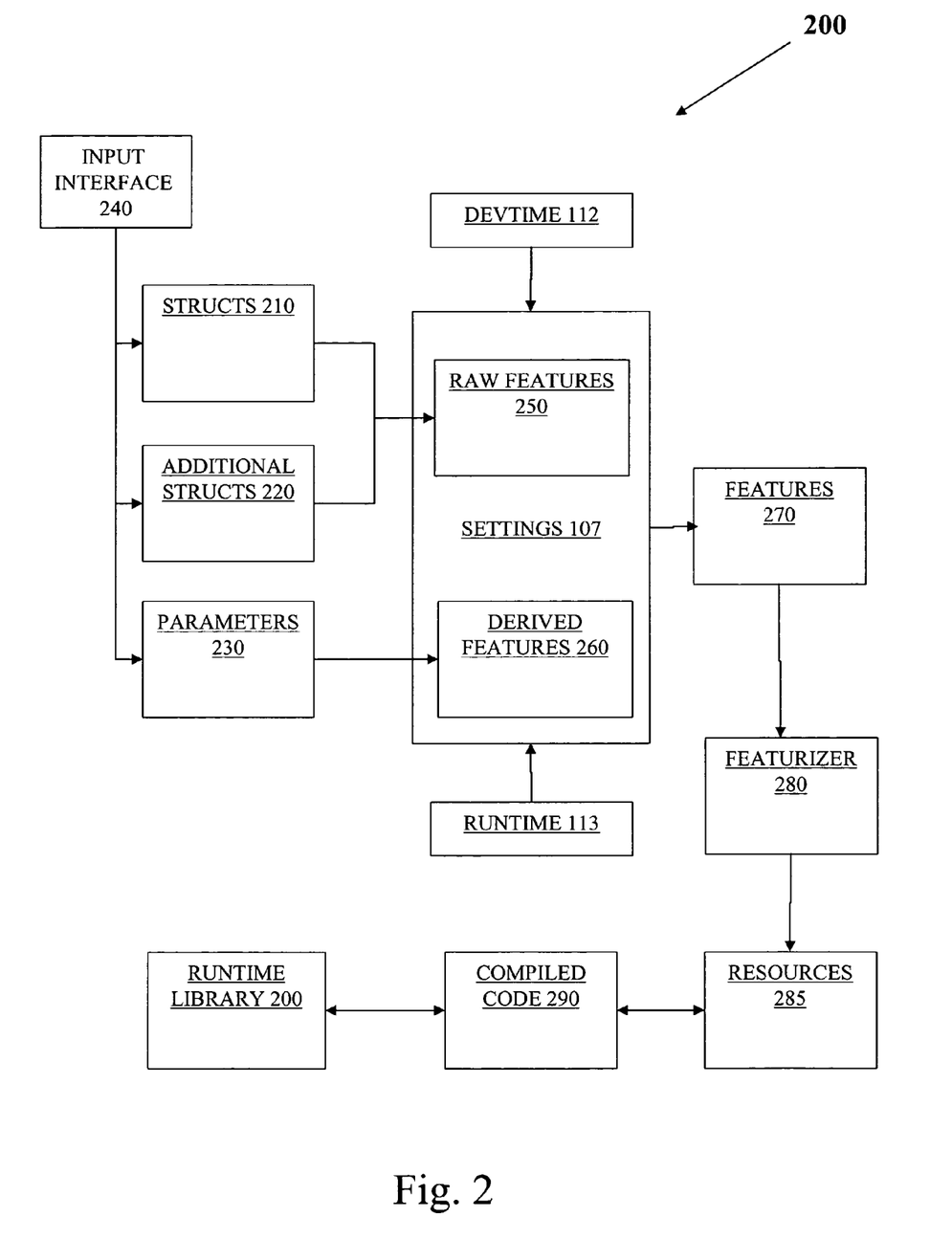
FIG. 2 shows a work flow and elements for embedding specialized elements in an application.

FIG. 2 shows a work flow and elements for embedding specialized elements in an application.

Several elements in FIG. 2 are supplied by the supplier to the client (developer) in order to permit the client to incorporate specialized elements into an application. These elements include code for the specialized elements and configurable data, which can be viewed as an SDK.

The code for the specialized elements is preferably in a compiled runtime library, shown in FIG. 2 as runtime library 200. In the interest of preserving any proprietary information in the code, source code for the elements preferably is not made available to the client. However, source code can be provided if so desired.

The configurable data in FIG. 2 includes required structs 210, additional structs 220, and parameters 230. These items preferably are provided in the form of templates that can be edited by the client.

In some embodiments, the client edits the structs and parameters directly, for example using any programming tool or text editor. In other embodiments, input interface 240 provided by the supplier is used to configure some or all of the structs and parameters. The input interface can be a text based or graphical user interface (GUI). Other configuration techniques can be used without departing from the teachings of the invention.

Required structs 210 and additional structs 220 are configured by the client so as to define raw features 250. Raw features are a subset of values and structures used or generated by an application that the specialized elements need to access, either directly or indirectly, in order to interact with that application.

In a preferred embodiment, required structs 210 are in the form of a header (.h) file. These structs represent a minimum set of features that must be present for the specialized elements to function. Also in a preferred embodiment, additional structs 220 are in the form of an iKuni definitions (.ik) header file. These structs represent additional features that are needed to permit the specialized elements to provide added functionality to the application.

The .h and .ik header files preferably include declarations of data types, for example C/C++ declarations. They preferably do not include any logic. The header files can include special annotations to assist in later processing. For example, a $ delimiter can be used to provide an annotation about a variable, as shown for example below:

```
typedef struct Info
{
    float position[2];
    float value [2];
    int status;
    int color; // $ firm $
    // etc.
}
```

In this example, the annotation within $ . . . $ indicates that "color" is a "firm" variable. Firm variables are only evaluated once at runtime and are considered to be constants thereafter. Some other possible annotations and possible meanings are listed below:
- const: a const feature never alters its value
- variable: a variable feature can vary between queries, but never during a query
- volatile: a volatile feature can alter its value at any time The invention is not limited to these annotations or to these particular definitions for the annotations.

Because raw features 250 include variable declarations for values and structures used or generated by the application, the header files (or other embodiment of the raw feature definitions) are supplied for compiling the application. This is represented by the diagonal arrow labeled "raw features" in FIG. 2.

The client can use the names of the declared raw features for features in their application. If those names are used, the raw features will be directly available for use by the specialized elements. This results in very efficient interaction between the application and the specialized elements, which can be very important in certain online applications such as games and simulations.

However, the client can also choose to use their own names for features in the application. If the client uses their own names, the application will have to marshal data into values and structures with names that match the declared raw features so that the specialized elements can access that data. Efficiency tends to be somewhat lessened by having to marshal the data; however, this approach still results in fairly efficient operation.

As stated above, the configurable data in FIG. 2 also includes parameters 230. These parameters define derived features 260 for the specialized elements. Derived features refer to values, structures, and functions used by the specialized elements to perform their analysis. Derived features can be derived based on one or more raw features and/or other derived features.

In a preferred embodiment, the derived features include predicates and targets.

The predicates are derived features that provide a context for data analysis. For example, in the context of a battlefield simulation, some predicates might be a health of a character, a number of opposing characters present, distances to those characters, and the like.

The targets represent objects or items that can be the subjects of queries and responses by the specialized elements. For example, in the context of a battlefield simulation, a target might be a player character about whom the application might ask the specialized elements to make a prediction.

The parameters can define additional functions or features. For example, the parameters can define debugging functions for use during runtime.

Parameter definitions can involve values for thresholds to be used by a specialized element, names of and/or pointers to variables, arrays, functions, and other data structures corresponding to information used or generated by an application (i.e., raw features), expressions involving values, names of and/or pointers to variables, arrays, functions, and other data structures. In a preferred embodiment, the parameter definitions are expressed in a feature specification language (FSL). An example of a FSL is described in depth in the incorporated provisional application.

The parameter definitions preferably form a computational graph. Alternatively, the derived features can be embodied in a flat file of definitions, a relationship database, or in some other form.

As discussed above, the configured structs and parameters form settings that bridge the devtime and runtime aspects of the invention. These settings create a link through which the application and the specialized elements can communicate data within their shared ontology.

The features are instantiated 270 from their definitions before being passed to featurizer 280. Instantiation preferably involves checking the features for proper dependencies. In addition, instantiation involves expanding the definitions for all instances of defined features.

Featurizer 280 operates on the instantiated features to generate models or other resources 285. These resources are used by the specialized elements to analyze data, to be able to answer queries framed in terms of predicates and targets (i.e., derived features). In a preferred embodiment, these models or other resources are similar to art or map resource files.

Compiled code 290 for the application that includes calls to runtime library 200 are linked to the library and resources 285, after which the application can be executed 295 for use.

FIG. 2 includes an annotation that instantiation, featurization and execution can occur during both development and use. During development, execution can be used for debugging. In addition, resources 285 can be modified during development through execution of the application, for example in the context of training for machine learning. The modified resources can be stored for later shipment along with the application to an end user.

If learning is to continue, resources 285 can continue to be modified during use by an end user. Alternatively, some or all of the resources could be frozen so as to freeze the data analysis, machine learning, or other models.

Figure 3:
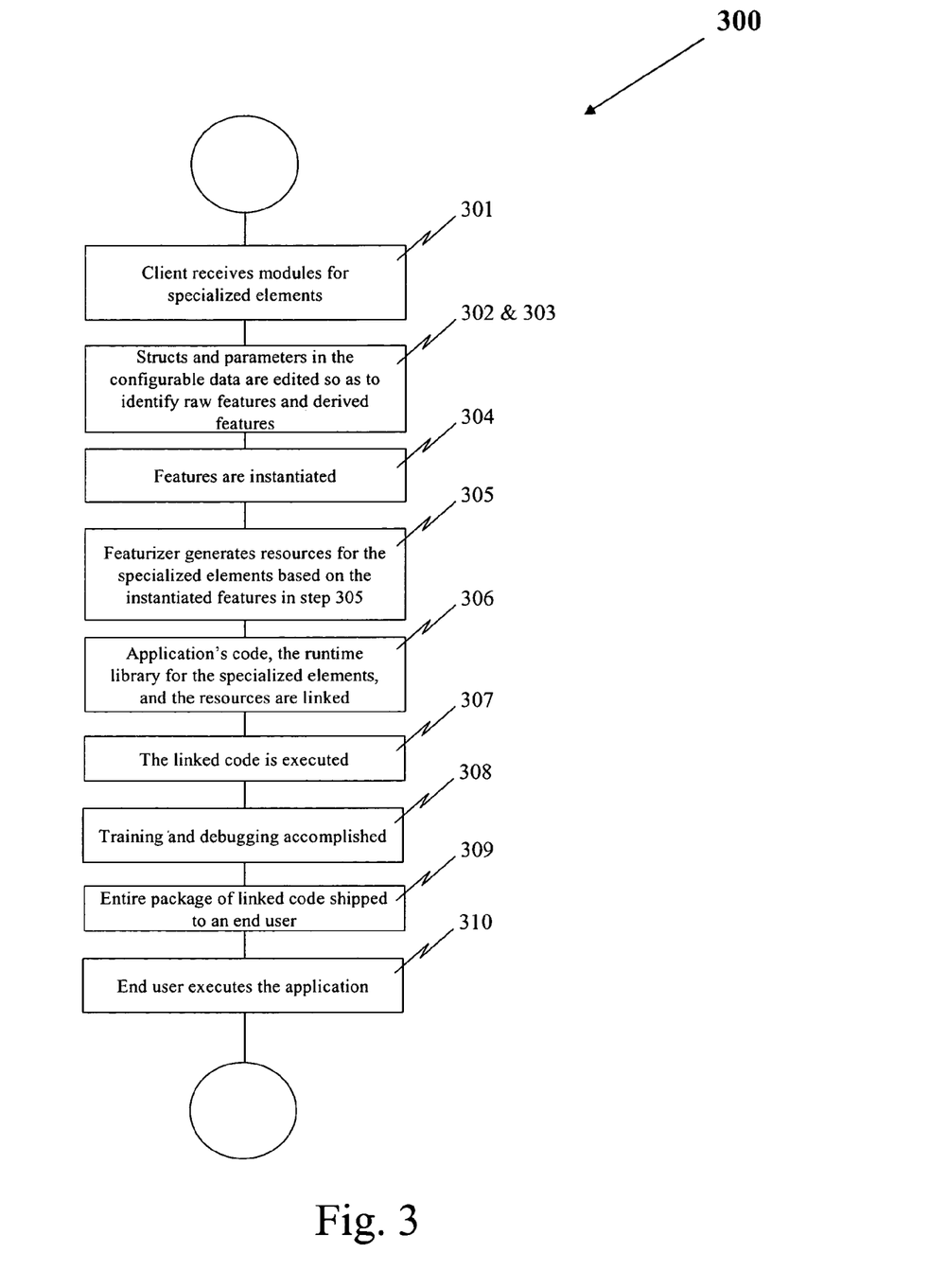
FIG. 3 shows a flowchart of embedding specialized elements in an application.

FIG. 3 shows a flowchart of embedding specialized elements in an application.

A method 300 is performed using the workflow shown in FIG. 2. Although the method 300 is described serially, the flow points and steps of the method 300 can be performed by separate elements in conjunction or in parallel, whether asynchronously or synchronously, in a pipelined manner, or otherwise. There is no particular requirement that the method 300 must be performed in the same order in which this description lists flow points or steps, except where explicitly indicated.

In step 301, a client receives modules for specialized elements, preferably including at least a runtime library and configurable data, from a supplier.

Steps 302 to 305 represent devtime.

In steps 302 and 303, structs and parameters in the configurable data are edited so as to identify raw features and derived features (e.g., predicates and targets). The parameters preferably are defined and edited in a functional specification language (FSL). Editing can be manual or through an input interface.

In step 304, the features are instantiated. Instantiation preferably involves checking the features for proper dependencies. In addition, instantiation involves expanding the definitions for all instances of defined features.

A featurizer generates resources for the specialized elements based on the instantiated features in step 305. These resources are used by the specialized elements to analyze data so as to be able to answer queries framed in terms of predicates and targets (i.e., derived features). In a preferred embodiment, these models or other resources are similar to art or map resource files.

Steps 306 to 308 represent runtime.

The configured features, parameters and resources, which together form settings for the specialized elements, form a link between the devtime steps and the runtime steps.

In step 306, the application's code, the runtime library for the specialized elements, and the resources are linked. The linked code is executed in step 307.

Training and debugging occur in step 308. In training, the resources can be modified by the specialized elements "on the fly." These modifications can be kept, discarded, or modified as desired.

Development of the application, embedding the specialized elements, and training the elements is usually an iterative process. Thus, the client can go from step 308 to any of the previous steps.

Once the client is satisfied with the embedded specialize elements and associated settings and resources, the entire packed of linked code can be shipped to an end use. This is shown as step 309.

In step 310, the end user executes the application. For example, if the application is a game for a game counsel, the end user plays the game. Training might continue or might be frozen, depending on how the application is designed and possibly on choices and inputs from the end user.

Runtime Example

Figure 4:
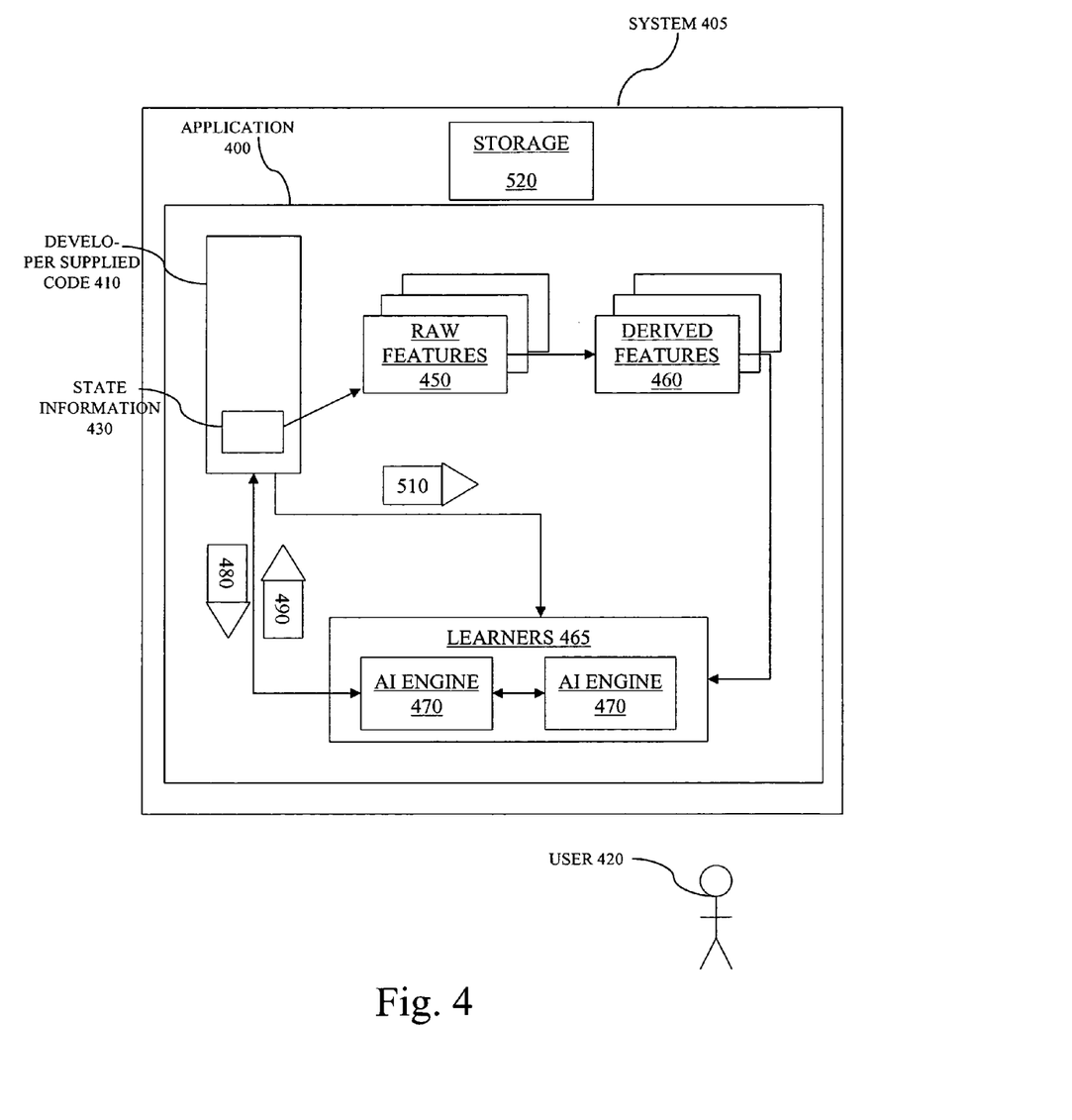
FIG. 4 shows a block diagram of an example of a system in which machine learning has been embedded.

FIG. 4 shows a block diagram of an example of a system in which machine learning has been embedded. The invention is equally applicable to other types of specialized elements that implement different techniques of data analysis. Application of the invention to those techniques would not require undue experimentation or further invention.

In this example, the specialized elements enable machine learning in an application that is ready for training and debugging by a developer or use by an end user.

An application 400 running on a system 405 includes developer supplied code 410. The code preferably includes program structures such as data structures, data types, function entry points, function pointers, object data types, object methods, and the like. Some, all, none or different structure might be present depending on the way in which the code 410 is designed.

One or more users 420 typically interact with the application 400, although the invention is also applicable to applications and code that does not interact with users.

In one embodiment, described in more detail in the Incorporated Disclosure, the application is a game, for example a simulation or other game involving player and non-player characters. The invention is equally applicable to non-game and non-simulation applications.

The code 410 includes state information 430. The state information can include, for example, variables, values, arrays, objects (e.g., C++ objects), pointers, and/or other data structures that define or store information used by the application 400.

According to the invention, raw features 450 include information from state information 430. The raw features might include, without limitation, the actual values, the data structures that store those values, pointers to the values and data structures, functions and object methods capable of determining the values and data structures, pointers to those functions and object methods, and the like.

There might be a very great many raw features 450. The Incorporated Disclosure provides examples of raw features in the setting of a game or simulation.

The derived features 460 include a set of features derived in response to the raw features 450, such as for example by calculating the values of those derived features 460 using the values of the raw features 450.

A derived feature 460 might include a weighted sum of a set of raw features 450, a function calculation in response to a set of raw features 450, and the like.

A derived feature 460 might be determined using one or more predefined calculations or operations performed on one or more raw features, raw features and derived features, or both raw features and derived features.

A derived feature 460 might also or instead be determined using one or more learned or derived calculations or operations performed on one or more raw features, raw features and derived features, or both raw features and derived features.

For example, not intended to be limiting in any way, a derived feature 460 might include one or more of the following data:

A derived feature 460 might include a Boolean value or a predicate operator, such as a determination whether some condition is true at the moment with regard to the application 400.

A derived feature 460 might include a Boolean value or a predicate operator defined in response to already-known predicates.

A derived feature 460 might include an iterator defined in response to an array of already-known raw features 450 or derived features 460.

A derived feature 460 might include an element of an iterative operator by selecting one or more objects from that iterative operator.

A derived feature 460 might be defined in response to other raw features 450, other derived features 460, or recursively defined in response to a variant form of the same derived feature 460 (such as for example a sorted version of an array or list).

A derived feature 460 might be defined in response to a machine learning elements (described below), with the effect that an output of a machine learning element might be used as an input for defining a derived feature 460.

One aspect of the invention is the provision of a selected set of derived features needed for effective machine learning. The inventors have found that it is non-obvious and unexpectedly useful to provide such a selected set of derived features.

First, this has the effect of allowing the code developer to not have to think about which derived features are going to be derived from the raw features (or other system state variables) of the application when designing or implementing that application.

Second, this has the effect of allowing the code developer to not have to design any code or data structures for providing those derived features, and also allowing the developer to not have to design any code or data structures for computing those derived features.

Third, this has the effect of allowing the code developer to not have to think about any learning aspects of the application, and to not have to design any code or data structures therefore.

Fourth, this has the effect of allowing the code developer to call upon learners 465 provided by the invention to ask for responses to queries that could benefit from machine learning.

After reading this application, other and further advantages of providing a selected set of derived features will be clear to those skilled in the art. Moreover, these other and further advantages will be clear to be within the scope and spirit of the invention, and not to involve any undue experimentation or further invention.

Learners 465 are capable of providing dynamic machine learning to code 410 based on derived features 460. Learners 465 are shown in FIG. 4 as including one or more artificial intelligence (AI) engines 470 that respond to queries 480 from code 410 with responses 490.

AI engines 470 embody machine learning techniques. In a preferred embodiment, one or more AI engines are capable or learning from prior situations, for example as described by derived features 460, and making predictions and/or suggestions based on such learning.

Examples of applicable machine learning techniques include, but are not limited to, context-based learners, exponential gradient techniques based on weighted sums of raw and/or derived features, Bayesian classifiers, neural networks, expert systems, hidden Markov models, partially observable Markov decision process models, other simulation engines, etc. An example of a context-based learner is described in detail in the Incorporated Disclosure.

Examples of queries 480 can include, for example and without limitation, requests for predictions, suggested actions, identifications of goals, rankings of goals, rankings of factors, rankings of other objects or information, identifications of relative or absolute probabilities, determinations of uncertainty, selections of what information is most/least critical, identifications of most/least common results over a distribution of results, reasons for predicting actions or for other responses, and other information. Responses 490 can include, for example and without limitation, the requested predictions, actions, identifications, rankings, determinations, selections, reasons, and other information. Other types of queries and responses can be used as desired.

Training signals 510 provide information and feedback from code 410 to learners 465. The feedback could indicate a result of taking action based on responses 490, a comparison of a prediction in responses 490 to what actually occurred, and other training signals of types known in the art of machine learning.

AI engines 470 of learners 465 preferably use the training signals to learn and adapt, thereby enhancing the operation of application 400. Learning could be confined to a learning or training mode during which responses are not sent to code 410. Alternatively, learning could continue during an operational mode during which responses are sent to code 410.

Storage

The storage 520 includes a device for storing electronic data including but not limited to a hard disk drive, an optical drive, a silicon chip storage element (smart media card, external storage card, random access memory). Code and data for the application 400 preferably can be saved to the storage 520.

In one embodiment, data that is generated by the learners 465 might be saved and loaded, either on demand, or in response to particular user inputs. This data might be used as to initiate AI engines 470. The data might include parameters that define a starting point for learning by the AI engines, a current or prior state of learning by the AI engines, or any other information regarding the learners 465 and AI engines 470. The data might define a pre-training or post-training state for the learners and AI engines.

Runtime Example

Figure 5:
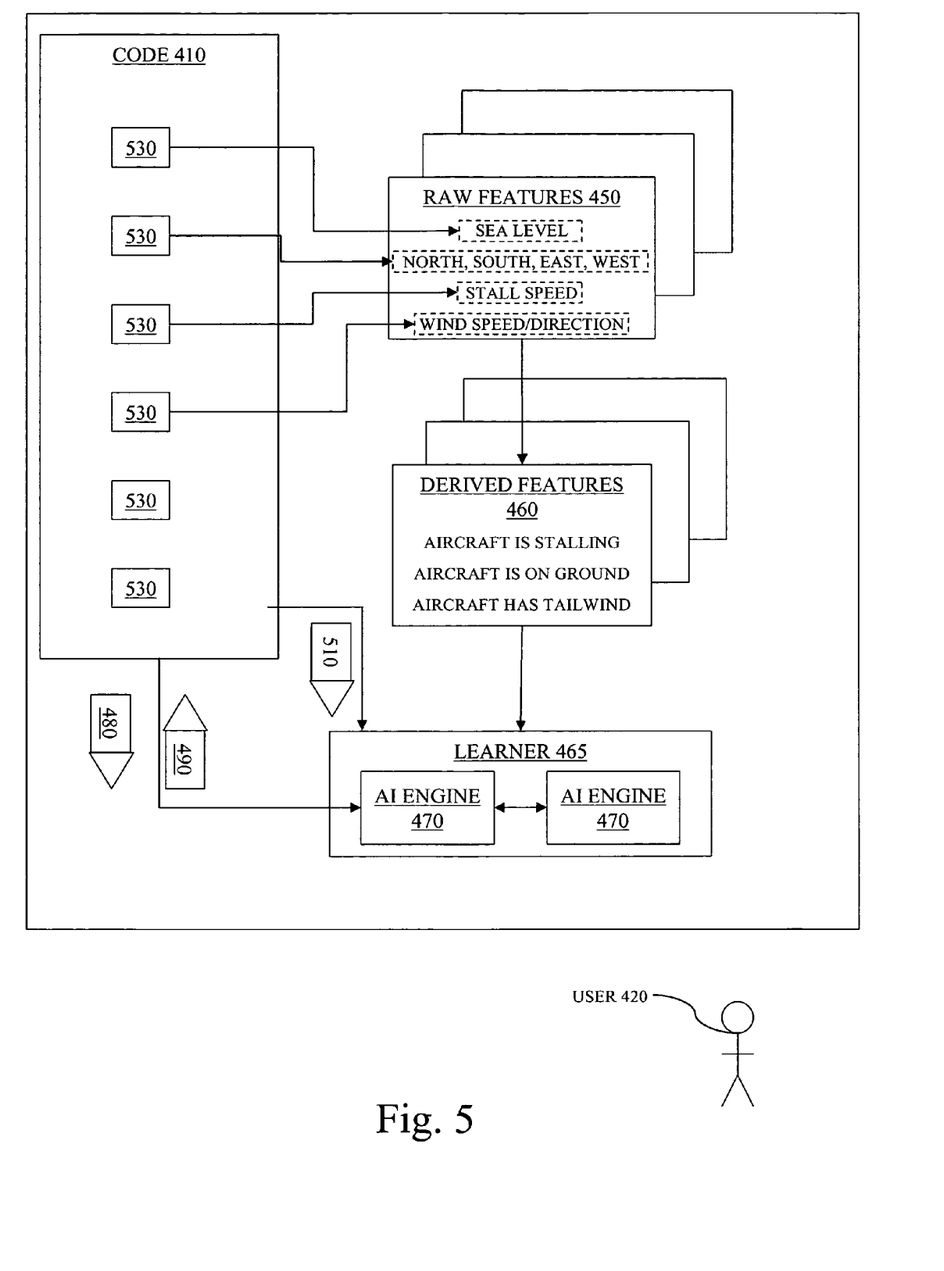
FIG. 5 shows a block diagram of an example of embedded machine learning.

FIG. 5 shows a block diagram of an example of embedded specialized elements, in this case machine learning code. The invention is not limited in any way to the details of this example.

Raw features 450 are shown in FIG. 5 as including various values and indications for code 410. A learner according to the invention generates the derived features 460 from the raw features 450 and possibly from other derived features 460.

In the example shown in FIG. 5, the code is for a simulator such as a flight simulator. The various raw features 450 relate to information about the flight simulation. The particular raw features shown in FIG. 5 are meant to be illustrative only; actual code for a flight simulator might use all, some, none, or different raw features.

The derived features 460 in FIG. 5 represent relationships between some of raw features 450. Derived features 460 according to the invention are not limited to such relationships. Furthermore, the particular relationships shown in FIG. 5 are meant to be illustrative only; actual derived features for a flight simulator might use all, some, none, or different derived features.

In order to generate the derived features, the learner must know where in the code 410 to find the corresponding raw features 450. The locations of or pointers to the raw features are shown in FIG. 5 as access points 530. The access points preferably are extracted from the code based on configuration information supplied by the code's developer and based on templates supplied for this purpose, as explained in more detail above with reference to FIGS. 1 and 3.

The derived features 460 are supplied to AI engines 470, where they are used to generate responses 490 to queries 480 from code 410. In FIG. 5, an example of queries 480 is shown as a query for what a next action should be, and an example of response 490 is that action. Any other types of queries and responses could be used.

The code 410 supplies training signals 510 to AI engines 470, which use the signals to learn and to adapt according to the nature of the AI engines.

Operation at Runtime

Figure 6:
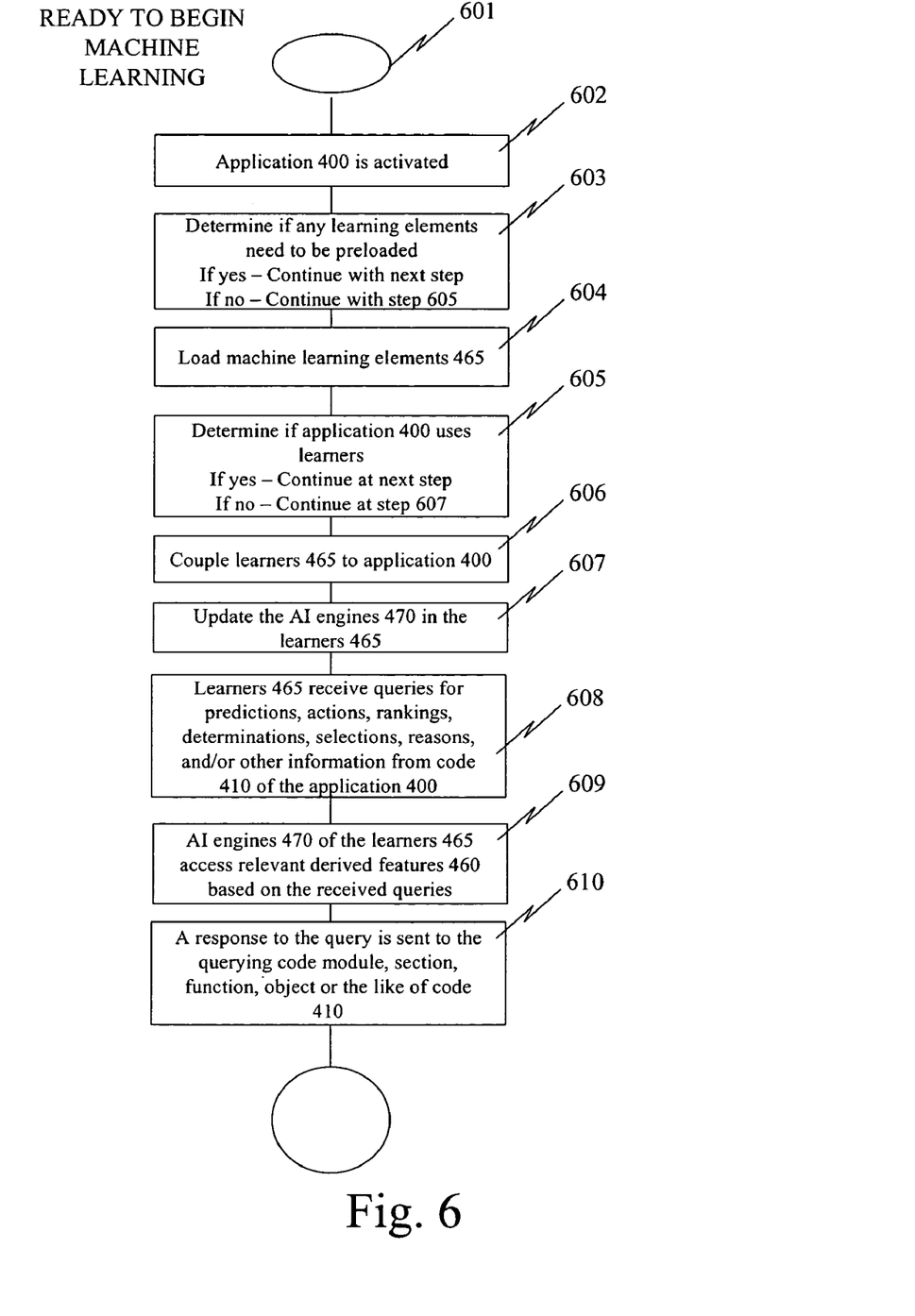
FIG. 6 shows a process flow diagram of a method of operating in a system in which machine learning has been embedded.

FIG. 6 shows a process flow diagram of a method of operating in a system in which machine learning has been embedded.

A method 600 is performed by the application 400. Although the method 600 is described serially, the flow points and steps of the method 600 can be performed by separate elements in conjunction or in parallel, whether asynchronously or synchronously, in a pipelined manner, or otherwise. There is no particular requirement that the method 600 must be performed in the same order in which this description lists flow points or steps, except where explicitly indicated.

Associating, Updating and Using Behavior Models

At a flow point 601, the method 600 is ready to begin utilizing machine learning that is embedded in an application as discussed herein.

At a step 602, the application 400 is activated, and the method 600 begins to operate in conjunction or combination with the application 400.

At a step 603, the method 600 determines if any learning elements or information for use by learning elements need to be pre-loaded. If so, the method 600 performs the next step (the step 604), and continues with the step thereafter (the step 605). If not, the method 600 skips the next step (the step 604), and continues with the step thereafter (the step 605).

At a step 604, the method 600 loads one or more machine learning elements 465, for example including AI engines 470 and stored or pre-set settings for those engines.

At a step 605, the method 600 determines that the application 400 uses one or more learners 465. If so, the method performs the next step (the step 606), and continues with the step thereafter (the step 607). If not, the method 600 skips the next step (the step 606), and continues with the step thereafter (the step 607).

The step 605 could include determining which of plural available learners are going to be used by the application 400.

At a step 606, the method 600 couples one or more learners 465 to application 400, as determined in the previous step (the step 605).

At a step 607, the method 600 updates the AI engines 470 in the learners 465, for example based on training signals 610 from code 410 of the application 400. The step of training could involve updating coefficients, weights, or other values used by the AI engines.

At a step 608, the learners 465 receive queries for predictions, actions, identifications, rankings, determinations, selections, reasons, and/or other information from code 410 of the application 400.

At a step 609, the AI engines 470 of the learners 465 access relevant derived features 460 based on the received queries. As discussed above, the derived features 460 are based at least in part on raw features 450 in code 410. If the raw features 450 need to be access, learners 465 use access points 430 to do so.

At a step 610, a response to the query is sent to the querying code module, section, function, object or the like of code 410.

In a training mode, less than all of these steps might be performed. For example, step 610 might be skipped in a training mode. Conversely, if the learners are considered to be fully trained, step 607 might be skipped. Other variations are possible.

Those of steps 607 to 610 that are performed preferably are repeatedly executed so as to facilitate learning by the software agents. As raw features 450 and derived features 460 change, learners 465 learn and adapt, permitting application 400 to benefit from the machine learning expertise embodied in the derived features 460 and AI engines 470 of learners 465. This continues until the game ends in steps 611 and 612.

Interrelation of Method Parts

After reading this application, those skilled in the art will recognize that many variations are possible that would be workable, that such variations are within the scope and sprit of the invention, and that such variations would not require undue experimentation or further invention.

For example, not intended to be limiting in any way, the following aspects of the method 600 would be clear to those skilled in the art:

Each of steps 607 to 610 can be, and preferably are, performed in parallel. This has the effect that the method 600 can update the learners 465 concurrently with using those learners 465.

In the context of the invention, there is no particular requirement for learning to start and stop when the application starts or stops. For example, learning might be conducted for only a short duration after the learners start, or at pre-selected time durations, or at periodic time durations, or at time durations responsive to the learners themselves.

In the context of the invention, it is possible for learning to be conducted in context at one or more levels of generality.

The more the learners are used, the more they learn. This can enhance overall application performance over time.

Learners can be directed to learn based on activities of single actors, groups of actors, historical records of past acts by actors, etc. In this context, an "actor" can be a user, another application or entity, or the like. Learning can be collaborative—attempting to get actors to work more effectively in concert—or competitive—attempting to defeat or overcome one or more other actors.

Alternative Embodiments

Although preferred embodiments are disclosed herein, many variations are possible which remain within the concept, scope, and spirit of the invention. These variations would become clear to those skilled in the art after perusal of this application.

After reading this application, those skilled in the art would recognize that the techniques described herein provide an enabling technology, with the effect that heretofore advantageous features can be provided that heretofore were substantially infeasible. Furthermore, those skilled in the art will recognize that these alternative embodiments and variations are illustrative and are intended to be in no way limiting.

The invention claimed is:

1. A system including specialized elements that are restricted to a particular domain of data analysis or processing; and configurable data that permits the specialized elements to be tailored to a particular application, thereby expanding applicability of the specialized elements to plural applications within the particular domain;

wherein the configurable data is configured at devtime to provide the link between the particular application and the specialized elements; and the link is used at runtime to enable the specialized elements to respond to queries from the particular application.

2. A system as in claim 1, wherein the configurable data is provided in one or more flat files, computational graphs, or relational databases generated or modified at devtime and accessed at runtime.

3. A system as in claim 1, wherein at least some of the configurable data is configured through manual editing.

4. A system as in claim 1, wherein at least some of the configurable data is configured through an input interface provided by the supplier along with the specialized elements.

5. A system as in claim 1, wherein a featurizer provided by the supplier is run at devtime to create a linkable library that implements the specialized elements, with the linkable library accessible by the particular application in accordance with the configurable data.

6. A system as in claim 5, wherein the featurizer analyzes dependencies in the configurable data.

7. A system as in claim 5, wherein the particular application links to and uses the linkable library to perform at least one of marshaling data from the particular application;

modifying models used by the specialized elements in response to the data;

using the models to respond to the queries from the particular application.

8. A method including the steps of using specialized elements that are restricted to a particular domain of data analysis or processing;

configuring configurable data that permits the specialized elements to be tailored to a particular application, thereby expanding applicability of the specialized elements to plural applications within the particular domain; and executing the particular application on a computing device to generate a result;

wherein the configurable data is configured at devtime to provide the link between the particular application and the specialized elements; and the link is used at runtime to enable the specialized elements to respond to queries from the particular application.

9. A method as in claim 8, wherein the configurable data is provided in one or more flat files, computational graphs, or relational databases generated or modified at devtime and accessed at runtime.

10. A method as in claim 8, wherein at least some of the configurable data is configured through manual editing.

11. A method as in claim 8, wherein at least some of the configurable data is configured through an input interface provided by the supplier along with the specialized elements.

12. A method as in claim 8, wherein a featurizer provided by the supplier is run at devtime to create a linkable library that implements the specialized elements, with the linkable library accessible by the particular application in accordance with the configurable data.

13. A method as in claim 12, wherein the featurizer analyzes dependencies in the configurable data.

14. A method as in claim 12, wherein the particular application links to and uses the linkable library to perform at least one of marshaling data from the particular application;

modifying models used by the specialized elements in response to the data;

using the models to respond to the queries from the particular application.

* * * * *